US012592222B2

(12) United States Patent
Braho

(10) Patent No.: US 12,592,222 B2
(45) Date of Patent: Mar. 31, 2026

(54) APPARATUSES, COMPUTER PROGRAM PRODUCTS, AND COMPUTER-IMPLEMENTED METHODS FOR ADAPTING SPEECH RECOGNITION CONFIDENCE SCORES BASED ON EXPECTED RESPONSE

(71) Applicant: Honeywell International Inc., Charlotte, NC (US)

(72) Inventor: Keith Braho, Murrysville, PA (US)

(73) Assignee: Honeywell International Inc., Charlotte, NC (US)

( * ) Notice: Subject to any disclaimer, the term of this patent is extended or adjusted under 35 U.S.C. 154(b) by 250 days.

(21) Appl. No.: 18/365,694

(22) Filed: Aug. 4, 2023

(65) Prior Publication Data

US 2025/0046299 A1 Feb. 6, 2025

(51) Int. Cl.
| | |
|---|---|
| *G10L 15/07* | (2013.01) |
| *G10L 15/065* | (2013.01) |
| *G10L 15/14* | (2006.01) |
| *G10L 15/18* | (2013.01) |
| *G10L 15/22* | (2006.01) |
| *G10L 15/26* | (2006.01) |

(Continued)

(52) U.S. Cl.
CPC ............ *G10L 15/14* (2013.01); *G10L 15/065* (2013.01); *G10L 15/07* (2013.01); *G10L 15/075* (2013.01); *G10L 15/1815* (2013.01); *G10L 15/22* (2013.01); *G10L 15/26* (2013.01); *G10L 15/08* (2013.01); *G10L 15/10* (2013.01); *G10L 15/16* (2013.01); *G10L 15/19* (2013.01); *G10L 2015/227* (2013.01)

(58) Field of Classification Search
None
See application file for complete search history.

(56) References Cited

U.S. PATENT DOCUMENTS

| | | | | | |
|---|---|---|---|---|---|
| 7,103,546 | B2 * | 9/2006 | Rose | ...................... | G10L 15/19 |
| | | | | | 707/999.005 |
| 7,827,032 | B2 * | 11/2010 | Braho | .................... | G10L 15/01 |
| | | | | | 704/251 |

(Continued)

FOREIGN PATENT DOCUMENTS

EP 3023980 A1 5/2016

OTHER PUBLICATIONS

EP24186578 European Search Opinion Nov. 12, 2024. (Year: 2024).*

(Continued)

*Primary Examiner* — Richard Z Zhu
(74) *Attorney, Agent, or Firm* — Alston & Bird LLP

(57) ABSTRACT

Embodiments of the disclosure provide for adapting speech recognition confidence scores to one or more users based on expect response(s). Some embodiments, receive input speech and generate, based on the input speech and using a recognition algorithm, a recognition hypothesis. The recognition hypothesis may comprise at least one pairing comprising a word and an initial confidence score associated with the word. Some embodiments, determine whether the recognition hypothesis matches an expected response based at least in part on comparing the word to a corresponding word in an expected response. Some embodiments, in response to determining that the recognition hypothesis matches the expected response, updates statistical data associated with the word.

18 Claims, 5 Drawing Sheets

(51) Int. Cl.

| | |
|---|---|
| *G10L 15/08* | (2006.01) |
| *G10L 15/10* | (2006.01) |
| *G10L 15/16* | (2006.01) |
| *G10L 15/19* | (2013.01) |

(56) References Cited

U.S. PATENT DOCUMENTS

| | | | | |
|---|---|---|---|---|
| 7,865,362 | B2 | 1/2011 | Braho et al. | |
| 7,895,039 | B2 * | 2/2011 | Braho | G10L 15/065 |
| | | | | 704/251 |
| 8,200,495 | B2 | 6/2012 | Braho et al. | |
| 8,255,219 | B2 * | 8/2012 | Braho | G10L 15/01 |
| | | | | 704/251 |
| 8,954,335 | B2 * | 2/2015 | Nakamura | G10L 15/32 |
| | | | | 704/7 |
| 10,147,428 | B1 * | 12/2018 | Shastry | H04N 19/187 |
| 10,269,342 | B2 * | 4/2019 | Braho | G10L 25/51 |
| 10,311,860 | B2 * | 6/2019 | Aleksic | G10L 15/197 |
| 10,832,664 | B2 * | 11/2020 | Biadsy | G10L 15/32 |
| 11,580,959 | B2 | 2/2023 | Freed et al. | |
| 12,205,586 | B2 * | 1/2025 | Aleksic | G10L 15/22 |

| | | | | |
|---|---|---|---|---|
| 2006/0178886 | A1 * | 8/2006 | Braho | G10L 15/22 |
| | | | | 704/E15.04 |
| 2016/0125873 | A1 * | 5/2016 | Braho | G10L 15/07 |
| | | | | 704/239 |
| 2016/0133253 | A1 * | 5/2016 | Braho | G10L 15/065 |
| | | | | 704/251 |
| 2018/0053502 | A1 * | 2/2018 | Biadsy | G10L 15/08 |
| 2018/0233131 | A1 * | 8/2018 | Aleksic | G10L 15/187 |

OTHER PUBLICATIONS

EP24186578 European Search Report Nov. 12, 2024. (Year: 2024).*

EP24186578 Amended Claims with Annotations Jul. 31, 2025 (Year: 2025).*

EP24186578 Intention to grant a European patent Oct. 20, 2025. (Year: 2025).*

Extended European Search Report Mailed on Nov. 12, 2024 for EP Application No. 24186578, 8 page(s).

Communication about intention to grant a European patent Mailed on Oct. 20, 2025 for EP Application No. 24186578, 6 page(s).

Decision to grant a European patent Mailed on Feb. 12, 2026 for EP Application No. 24186578, 2 page(s).

* cited by examiner

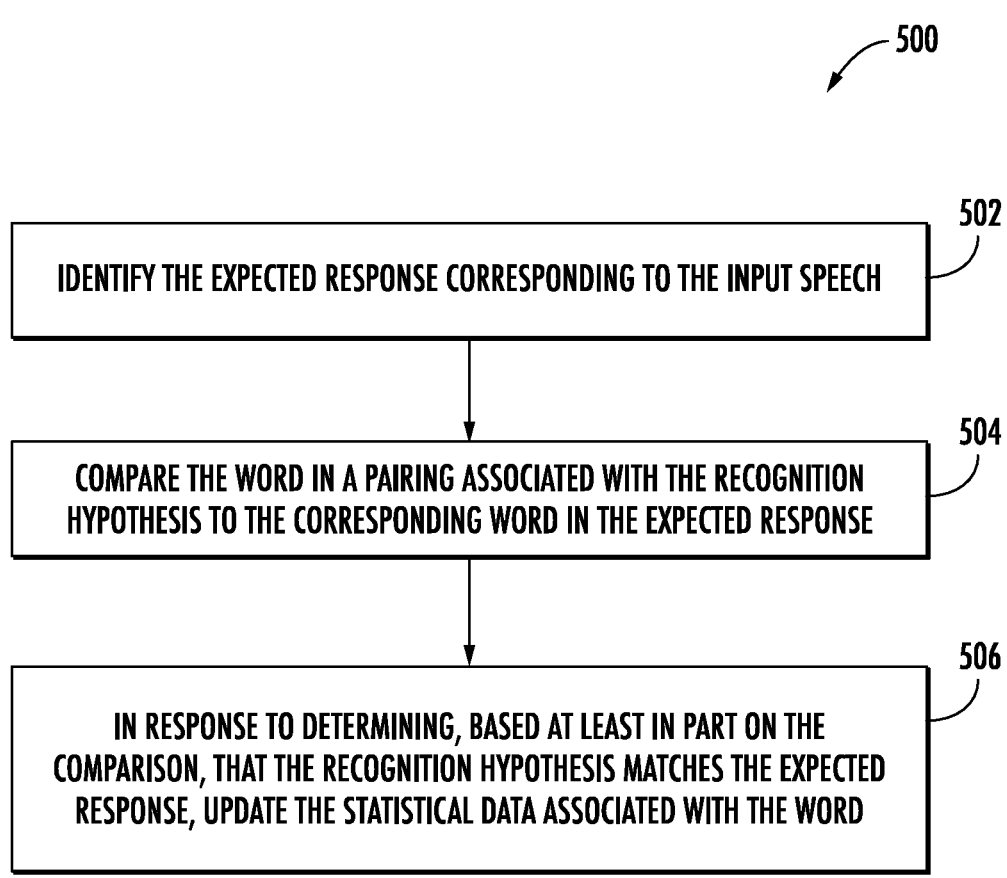

500

502

IDENTIFY THE EXPECTED RESPONSE CORRESPONDING TO THE INPUT SPEECH

504

COMPARE THE WORD IN A PAIRING ASSOCIATED WITH THE RECOGNITION HYPOTHESIS TO THE CORRESPONDING WORD IN THE EXPECTED RESPONSE

506

IN RESPONSE TO DETERMINING, BASED AT LEAST IN PART ON THE COMPARISON, THAT THE RECOGNITION HYPOTHESIS MATCHES THE EXPECTED RESPONSE, UPDATE THE STATISTICAL DATA ASSOCIATED WITH THE WORD

APPARATUSES, COMPUTER PROGRAM PRODUCTS, AND COMPUTER-IMPLEMENTED METHODS FOR ADAPTING SPEECH RECOGNITION CONFIDENCE SCORES BASED ON EXPECTED RESPONSE

TECHNICAL FIELD

Embodiments of the present disclosure are generally directed to speech recognition and, specifically, to using an expected response to adapt speech recognition confidence scores to user(s).

BACKGROUND

In various contexts, speech recognition has simplified many tasks, for example, in the workplace. However, Applicant has discovered problems with current implementations of speech recognition. Through applied effort, ingenuity, and innovation, Applicant has solved many of these identified problems by developing the embodiments of the present disclosure, which are described in detail below.

BRIEF SUMMARY

In general, embodiments of the present disclosure herein provide for adapting confidence scores for speech recognition to a user(s) using an expected response(s). Other implementations for adapting confidence scores will be, or will become, apparent to one with skill in the art upon examination of the following figures and detailed description. It is intended that all such additional implementations be included within this description, be within the scope of the disclosure, and be protected by the following claims.

In accordance with one aspect of the present disclosure, a computer-implemented method for adapting speech recognition confidence scores to a user is provided. The computer-implemented method is executable utilizing any of a myriad of computing device(s) and/or combinations of hardware, software, and/or firmware. In some example embodiments, an example computer-implemented method includes receiving input speech; generating, based on the input speech and using a recognition algorithm, a recognition hypothesis wherein the recognition hypothesis comprises at least one pairing comprising a word and an initial confidence score associated with the word; determining whether the recognition hypothesis matches an expected response based at least in part on comparing the word to a corresponding word in the expected response; and in response to determining that the recognition hypothesis matches the expected response, updating statistical data associated with the word, wherein the updated statistical data is configured for updating a confidence score adjustment value associated with the word.

In some example embodiments, the statistical data associated with the word comprises one or more of a sum measure, count measure, or sum of squares measure.

In some example embodiments, the statistical data for the word is determined based at least in part on each confidence score associated with the word in the recognition hypothesis and/or each initial confidence score associated with the word in at least one historical recognition hypothesis.

In some example embodiments, the example computer-implemented method further comprises storing the updated statistical data in data repository.

In some example embodiments, the example computer-implemented method further comprises generating an adjusted confidence score for the word by applying the confidence score adjustment value for the word to an initial confidence score associated with the word; and determining if the adjusted confidence score satisfies a rejection threshold for the word.

In some example embodiments, the recognition hypothesis is rejected in response to determining that at least one word in the recognition hypothesis is associated with an adjusted confidence score that fails to satisfy the rejection threshold for the at least one word.

In some example embodiments, the recognition hypothesis is accepted in response to determining that each word in the recognition hypothesis is associated with an adjusted confidence score that satisfies each word's respective rejection threshold.

In some example embodiments, the example computer-implemented method further comprises generating the updated confidence score adjustment value for the word based at least in part on the updated statistical data; and applying the updated confidence score adjustment value to a subsequent recognition hypothesis that includes another instance of the same word and an associated initial confidence score by adjusting the initial confidence score for the word in the subsequent recognition hypothesis based at least in part on the updated confidence score adjustment value.

In some example embodiments, the updated confidence score adjustment value for the word is generated based at least in part on a condition, wherein the condition represents that the average adjusted confidence score for the word based on a set of historical recognition hypotheses satisfies the rejection threshold for the word by a predefined value.

In some example embodiments, the updated confidence score adjustment value for the word is generated based at least in part on a condition, wherein the condition represents that the average adjusted confidence score for the word based on the recognition hypothesis and historical recognition hypotheses correspond to N standard deviations above the rejection threshold.

In some example embodiments, the word is accepted in response to determining that the word is associated with an adjusted confidence score that satisfies the rejection threshold for the word.

In accordance with another aspect of the present disclosure, an apparatus for adapting speech recognition confidence scores is provided. The apparatus in some embodiments includes at least one processor and at least one non-transitory memory, the at least one non-transitory memory having computer-coded instructions stored thereon. The computer-coded instructions in execution with the at least one processor causes the apparatus to perform any of the example computer-implemented methods described herein. In some other embodiments, the apparatus includes means for performing each step of any of the computer-implemented methods described herein.

In accordance with another aspect of the present disclosure, a computer program product for adapting speech recognition confidence scores is provided. The computer program product in some embodiments includes at least one non-transitory computer-readable storage medium having computer program code stored thereon. The computer program code in execution with at least one processor is configured for performing any one or the example computer-implemented methods described herein.

BRIEF DESCRIPTION OF THE SEVERAL VIEWS OF THE DRAWINGS

Figure 1:
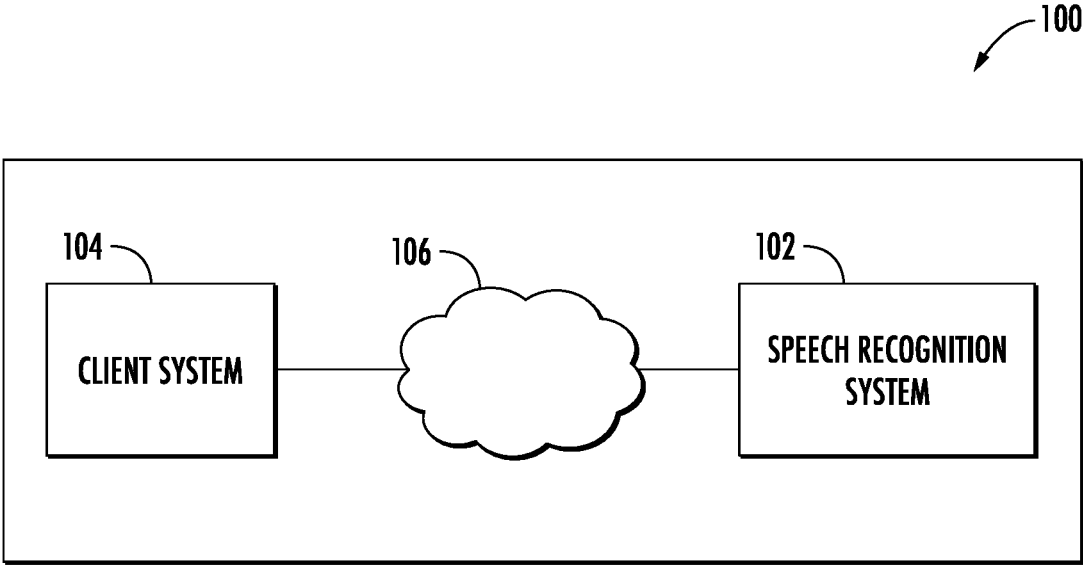
Figure 2:
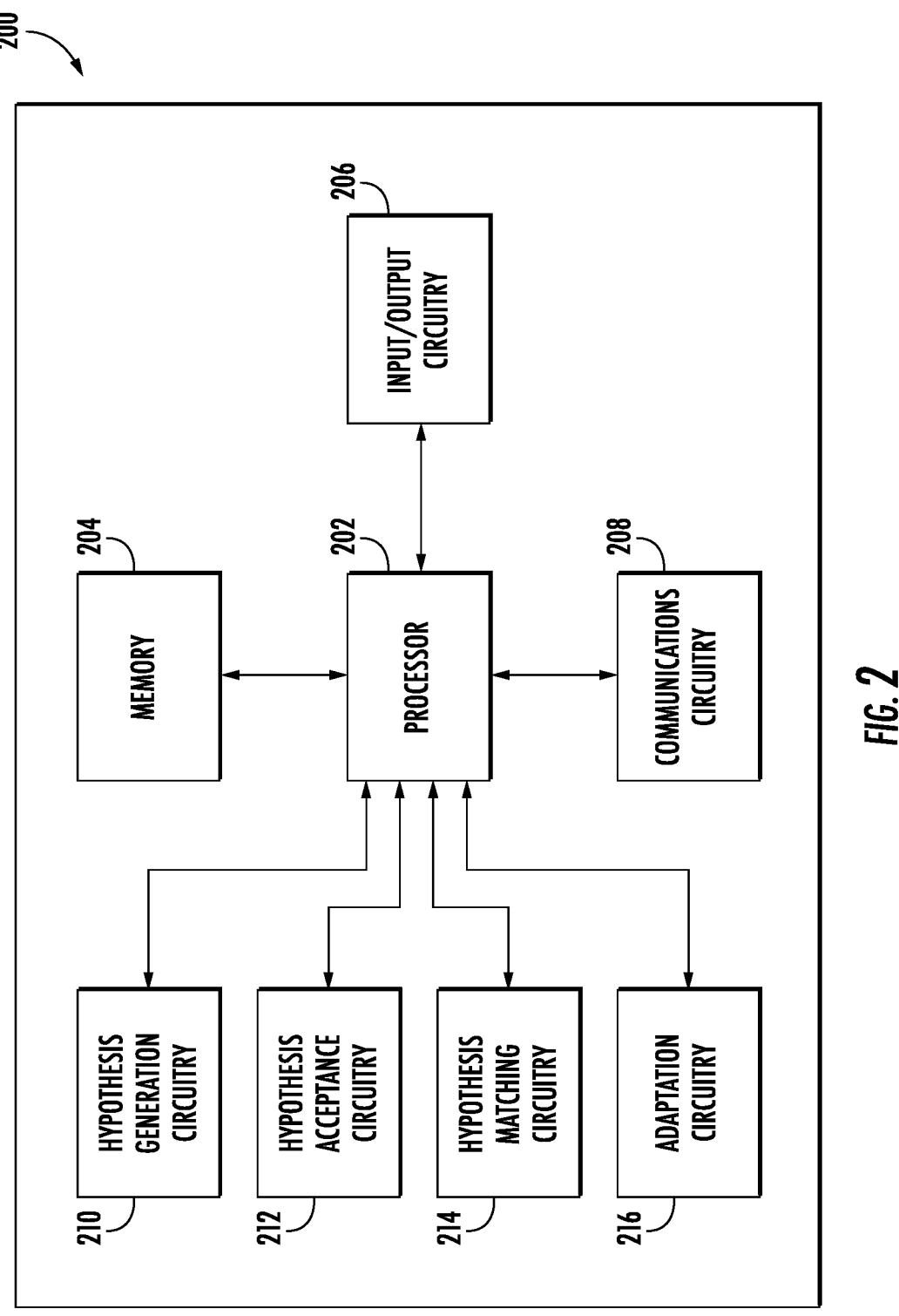
Figure 3:
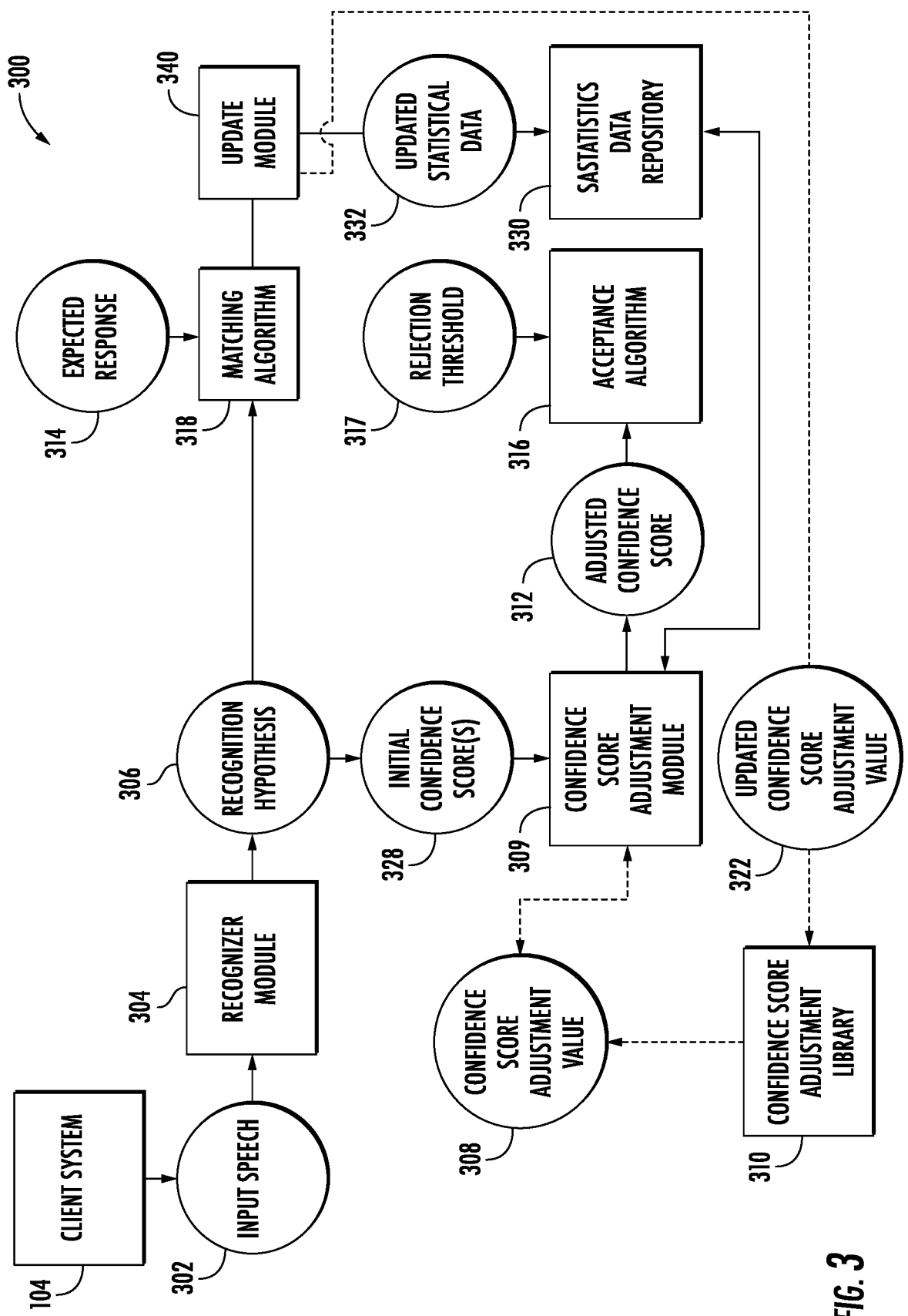
Figure 4:
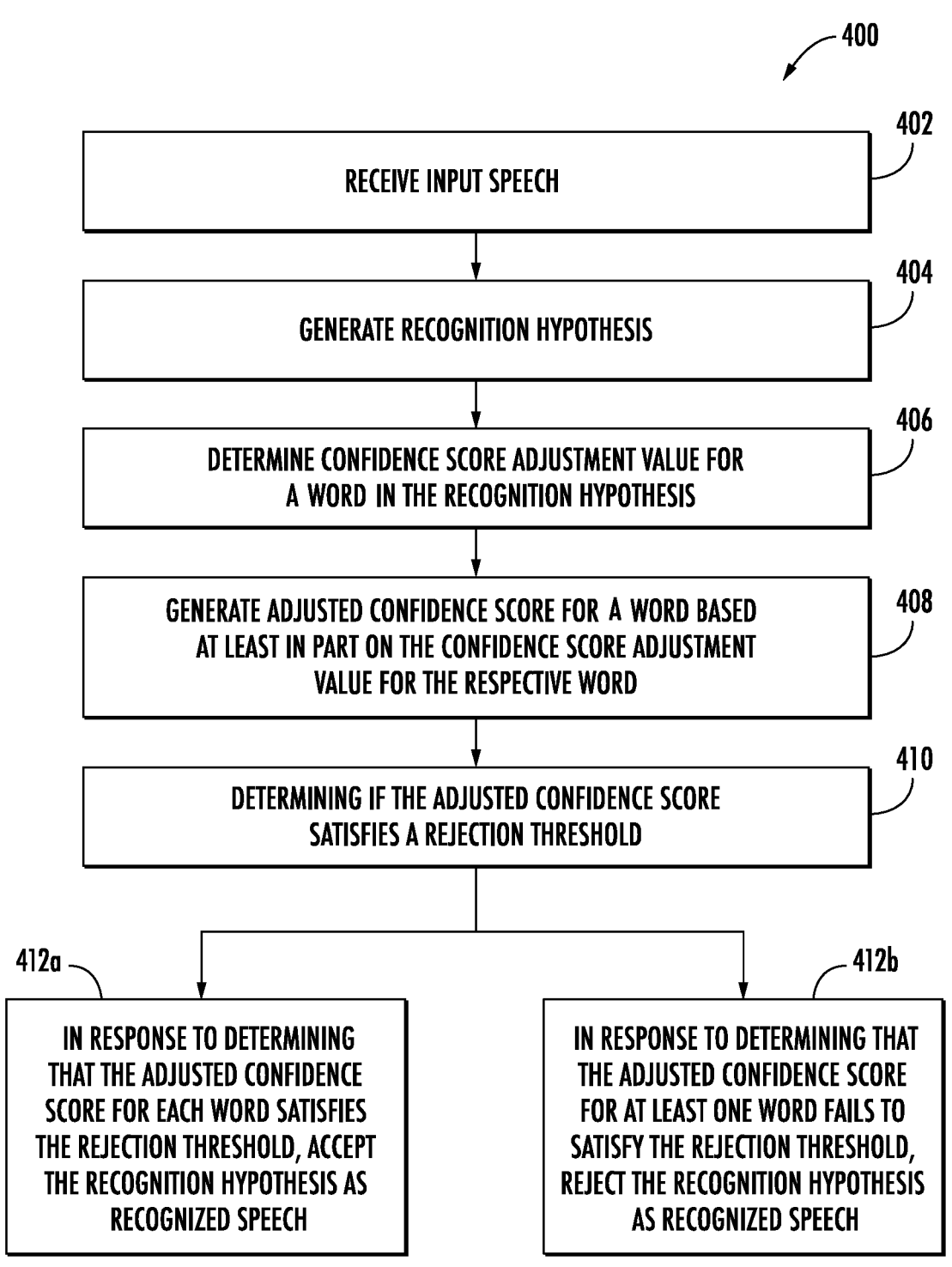

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus embodying a speech recognition system in accordance with at least one embodiment of the present disclosure;

FIG. 3 illustrates a visualization of an example data environment for adapting speech recognition confidence scores in accordance with at least one embodiment of the present disclosure;

FIG. 4 illustrates a flow chart depicting example operations of an example process for adjusting confidence score(s) in accordance with at least one embodiment of the present disclosure; and FIG. 5 illustrates a flow chart depicting example operations of an example process for adapting speech recognition confidence scores to a user(s) in accordance with at least one embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Speech recognition is relied upon in various environments for a variety of reasons. For example, speech recognition has simplified many tasks in a workplace by permitting hands-free communication with a computer. A worker may enter data by voice using a speech recognizer and commands or instructions may be communicated to the worker by a speech synthesizer. Speech recognition finds particular applicability in mobile computing devices. For example, wireless wearable terminals can provide a worker performing work-related tasks with desirable computing and data-processing functions while offering the worker enhanced mobility within the workplace. One particular area in which workers rely heavily on such wireless wearable terminals is inventory management. Generally, inventory-driven industries rely on computerized inventory management systems for performing various diverse tasks, such as food and retail product distribution, manufacturing, and quality control.

In one context, an overall integrated management system, for example, may involve a combination of a central computer system for tracking and management, and the individuals who use and interface with the computer system in the form of order fillers, pickers, and other workers. The workers handle the manual aspects of the integrated management system under the command and control of information transmitted from the central computer system to the wireless wearable terminal.

For example, as the workers complete their assigned tasks, a bi-directional communication stream of information is exchanged over a wireless network between wireless wearable terminals and the central computer system. Information received by each wireless wearable terminal from the central computer system is translated into voice instructions or text commands for the corresponding worker. Typically, the worker wears a headset coupled with the wearable device that has a microphone for voice data entry and an ear speaker for audio output feedback. Responses from the worker are input into the wireless wearable terminal by the headset microphone and communicated from the wireless wearable terminal to the central computer system. Through the headset microphone, workers may pose questions, report the progress in accomplishing their assigned tasks, and report working conditions, such as inventory shortages. Using such wireless wearable terminals, workers may perform assigned tasks virtually hands-free without equipment to juggle or paperwork to carry around. Because manual data entry is eliminated or, at the least, reduced, workers can perform their tasks faster, more accurately, and more productively.

An illustrative example of a set of worker tasks suitable for a wireless wearable terminal with voice capabilities may involve initially welcoming the worker to the computerized inventory management system and defining a particular task or order, for example, filling a load for a particular truck scheduled to depart from a warehouse. The worker may then answer with a particular area (e.g., freezer) that they will be working in for that order. The system then vocally directs the worker to a particular aisle and bin to pick a particular quantity of an item. The worker then vocally confirms a location and the number of picked items. The system may then direct the worker to a loading dock or bay for a particular truck to receive the order. As may be appreciated, the specific communications exchanged between the wireless wearable terminal and the central computer system can be task-specific and highly variable. During the interchange between the worker and the system, there may be instances where the system expects a specific response from the worker (e.g., when the worker is confirming his or her location).

While existing speech recognition systems generally address the task of determining the spoken input and recognizing the speech, there are still some drawbacks in such systems, for example, false rejections, false acceptance, and occurrences of out of vocabulary insertion errors to name a few. In this regard, speech is not always properly interpreted or recognized, especially as different users with differing speech patterns interact with the system. Embodiments of the present disclosure address the above-mentioned drawbacks as well as other challenges and difficulties associated with speech recognition. Specifically, embodiments of the present disclosure leverage expected responses to improve the accuracy of a speech recognition system.

Embodiments of the present disclosure provide for using expected responses to adapt speech recognition confidence scores to a particular user or set of users. In some embodiments, a recognition hypothesis is generated for a received input speech using a recognition algorithm(s). The recognition hypothesis may include one or more words and a confidence score associated with each of the one or more words. For example, each of the one or more words generated is assigned or otherwise associated with a confidence score that quantitatively indicates the likelihood (e.g., chance) that the particular word was accurately recognized. In some embodiments, for each word in the hypothesis, a corresponding confidence score adjustment value is determined (e.g., calculated) and/or tracked, and applied to the word to generate an adjusted confidence score based on an initial confidence score. The adjusted confidence score associated with a word is then compared to a rejection threshold. If an adjusted confidence score satisfies (e.g., exceeds, is below, is equal to, and/or the like) the rejection threshold, the corresponding word is accepted. If an adjusted confidence score fails to satisfy the rejection threshold, the particular word is rejected. In some example embodiments, the recognition hypothesis is rejected in response to determining that at least one word in the recognition hypothesis is associated with an adjusted confidence score that fails to satisfy the rejection threshold. In some example embodiments, the recognition hypothesis is accepted in response to determining that each word in the recognition hypothesis is associated with an adjusted confidence score that satisfies the rejection threshold. In some examples, the rejection threshold may be different for different words.

To improve accuracy, embodiments of the present disclosure leverage expected responses to update the confidence score adjustment value for a word in a manner that reduces the risk of false rejections, risk of false acceptance, risk of out of vocabulary insertion words, and/or the like. In some embodiments, the recognition hypothesis is compared to expected response(s) to determine if each of the one or more words in a hypothesis matches the corresponding word in the expected response. In some embodiments, for each word, in response to determining that the word matches the corresponding word in the expected response, the confidence score adjustment value for the word and/or statistical data associated with the word is updated. Alternatively or additionally, in some embodiments, the recognition hypothesis is compared to the expected response to determine an exact match (e.g., to determine that all the words in the expected response match the recognition hypothesis), and in response to determining that the recognition hypothesis matches the expected response, the confidence score adjustment value for each word is updated and/or statistical data associated with each word is updated. An updated confidence score adjustment value may be applied to subsequent occurrences of that word in subsequent recognition hypothesis that includes another instance of the same word. In some embodiments, the updated confidence score adjustment value for a word is calculated in real-time or near real-time with respect to the subsequent recognition hypothesis, for example, using updated statistical data associated with the word.

By updating confidence score adjustment values based on expected response(s), embodiments of the present disclosure reduce the risk of the confidence score adaptation from adapting away. For example, based on the use of an expected response and the requirement that the expected response matches the recognition hypothesis, embodiments prevents most incorrect and/or invalid data from being used in the statistics (e.g., statistical data) that are used to adapt. By way of example, if a background noise causes the word "six" to be recognized with a poor score, without the expected response check, the recognition system would adapt to expect the word "six" to have poor scores and would allow more "six" es with low scores to be recognized, making "six" more susceptible to being erroneously recognized in response to background noises.

Accordingly, the use of expected responses in embodiments to adapt confidence scores allows adaptation to occur with reduced risk of the confidence score adaptation adapting away, thus improving the recognition accuracy and obviating the need for a user to repeat an utterance for speech recognition processing by the speech recognition system. By obviating the need for a user to repeat an utterance for speech recognition processing, embodiments of the present disclosure improve worker (e.g., user) productivity and computing efficiency, and reduces network traffic.

Definitions

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "recognition hypothesis" refers to an output of a recognizer system associated with a speech input to the recognition system. In some embodiments, a recognition hypothesis comprises a sequence of one or more words and associated confidence score for each of the one or more words.

The term "expected response" refers to a sequence of one or more words that a user is most likely to speak at a particular execution point in a workflow. In some embodiments, an expected response is used to determine whether to update a confidence score adjustment value associated with a word.

The term "initial confidence score" refers to electronically managed data indicative of the likelihood (e.g., chance) of a word hypothesized by a recognizer system was accurately recognized. For example, in some embodiments, initial confidence score corresponds to a raw confidence score associated with a word hypothesized by a recognizer system.

The term "confidence score adjustment value" refers to electronically managed data representing a value that is applied to an initial confidence score associated with a word to adapt the confidence score for the word to one or more users. In some embodiments a confidence score adjustment value is maintained for a particular word across different instances of recognition hypotheses derived from spoken audio data.

The term "updated confidence score adjustment value" refers to electronically managed data representing confidence score adjustment value modified based at least in part on statistical data associated with the corresponding word.

The term "a model" refers to one or more algorithmic, statistical, and/or machine learning model(s) configured to generate an output. In some embodiments, one or more models are trained to generate updated confidence score adjustment values.

Example Systems and Apparatuses of the Disclosure

FIG. 1 illustrates a block diagram of a system that may be specially configured within which embodiments of the present disclosure may operate. Specifically, FIG. 1 depicts an example system 100. As illustrated, the system 100 includes a speech recognition system 102 configured to communicate with one or more client systems 104. In some embodiments, the speech recognition system 102 and the client system 104 communicate over one or more communication network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the system 100 are communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, stand-alone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary.

In some embodiments, the client system(s) is embodied in an on-premises system. In one embodiment, the client system(s) is/are embodied in an on-premises system within or associated with a particular industrial system, for example including any number of third-party device(s), sensor(s), and/or the like. Additionally or alternatively, in some embodiments, a client system 104 and the speech recognition system 102, are embodied as on-premises systems associated with a particular system associated with a warehouse, an industrial plant, etc. In some embodiments, the on-premises systems are communicatively coupled via at least one wired device. Additionally or alternatively, one or more of such systems may be remote from one another, for example where the client system represents an on-premises system corresponding to, for example, a particular industrial system, and where the speech recognition system 102 is a cloud system or otherwise remotely located from the client system.

In some embodiments, the client system 104 includes any number of computing device(s), system(s), physical component(s), and/or the like, that facilitates generation and/or use of a speech signal corresponding to an utterance by a user. For example, in some embodiments, the client system 104 embodies an input speech device configured to capture a speech signal from a user. In some embodiments, the client system 104 includes one or more end user terminal(s), server(s), and/or the like that are configured to perform such functions.

The speech recognition system 102 includes one or more computing device(s), system(s), and/or the like embodied in hardware, software, firmware, and/or a combination thereof, that perform speech recognition based on a speech signal. Additionally or alternatively, in some embodiments, the speech recognition system 102 includes one or more computing device(s), system(s), and/or the like embodied in hardware, software, firmware, and/or a combination thereof, that perform generation and/or maintenance of confidence score adjustment values for one or more words and/or perform generation and/or maintenance of statistical data associated with one or more words. In some embodiments, the speech recognition system 102 includes one or more specially configured application server(s), database server(s), end user device(s), cloud computing system(s), and/or the like. Additionally or alternatively, in some embodiments, the speech recognition system 102 includes one or more user device(s) that enable access to functionality provided by the speech recognition system 102, for example via a web application, native application, and/or the like. Alternatively or additionally still, in some embodiments, a client system is specially configured to provide access to the functionality of the client system(s).

In some embodiments, the speech recognition system 102 in conjunction with a client system(s), is configured to facilitate speech recognition and adapting confidence scores of a recognizer system (e.g., associated with a speech recognizer system) to a user(s). In some embodiments, the speech recognition system 102 is configured to facilitate generation, storage, and/or maintenance of a recognition hypothesis for an input speech. In some embodiments, the speech recognition system 102 is configured to update (e.g., modify) a confidence score adjustment value associated with a word. Alternatively or additionally, in some embodiments, the speech recognition system 102 is configured to update statistical data associated with a word.

In some embodiments, the speech recognition system 102 and the client system 104 communicate with one another to perform the various actions described herein. For example, in some embodiments, the speech recognition system 102 and one or more of the client systems 104 communicate to generate and store a recognition hypothesis. In some embodiments, the speech recognition system 102 and one or more of the client systems 104 communicate to display, configure, and/or update confidence score adjustment values leveraged by the speech recognition system to determine whether to accept or reject a word hypothesized by a recognizer system associated with the speech recognition system. In some embodiments, the speech recognition system 102 and one or more of the client systems 104 communicate to display, configure, and/or update statistical data leveraged by the speech recognition system to calculate confidence score adjustment values.

FIG. 2 illustrates a block diagram of an example apparatus that may be specially configured in accordance with at least one example embodiment of the present disclosure. Specifically, FIG. 2 depicts an example speech recognition apparatus ("apparatus 200") specially configured in accordance with at least one example embodiment of the present disclosure. In some embodiments, the speech recognition system 102 and/or a portion thereof is embodied by one or more system(s), such as the apparatus 200 as depicted and described in FIG. 2. The apparatus 200 includes processor 202, memory 204, input/output circuitry 206, communications circuitry 208, hypothesis generation circuitry 210, hypothesis acceptance circuitry 212, hypothesis matching circuitry 214, and/or adaptation circuitry 216. In some embodiments, the apparatus 200 is configured, using one or more of the sets of circuitry embodied by processor 202, memory 204, input/output circuitry 206, communications circuitry 208, hypothesis generation circuitry 210, hypothesis acceptance circuitry 212, hypothesis matching circuitry 214, and/or adaptation circuitry 216, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular specially-configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with performing speech recognition and adapting speech recognition confidence score(s) to a user(s). In some such embodiments, the processor 202 includes hardware, software, firmware, and/or a combination thereof that generates a recognition hypothesis for an input speech. In some such embodiments, the recognition hypothesis comprises a sequence of one or more words and an associated confidence score for each word of the one or more words. Additionally or alternatively, in some such embodiments, the processor 202 includes hardware, software, firmware, and/or a combination thereof that adjusts the confidence score associated with a hypothesized word based at least in part on a confidence score adjustment value associated with the word. Additionally or alternatively, in some such embodiments, the processor 202 includes hardware, software, firmware, and/or a combination thereof that compares the adjusted confidence score to a rejection threshold to determine if the word should be accepted or rejected. Additionally or alternatively, in some such embodiments, the processor 202 includes hardware, software, firmware, and/or a combination thereof that compares a recognition hypothesis to an expected response to determine if the word(s) of the recognition hypothesis match the corresponding words in the expected response. In some such embodiments, the processor 202 includes hardware, software, firmware, and/or a combination thereof that generates an updated confidence score adjustment value for a hypothesized word based at least in part on statistical data associated with the word, for example, using one or more models.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes hypothesis generation circuitry 210. The hypothesis generation circuitry 210 includes hardware, software, firmware, and/or a combination thereof, that supports generation and use of a recognition hypothesis for an input speech. For example, in some embodiments, the hypothesis generation circuitry 210 includes hardware, software, firmware, and/or a combination thereof, that receives input speech from, for example, a client system 104. Additionally or alternatively, in some embodiments, the hypothesis generation circuitry 210 includes hardware, software, firmware, and/or a combination thereof, that processes the input speech to generate a recognition hypothesis comprising a sequence of one or more words and associated confidence score for each of the one or more words. In some embodiments, hypothesis generation circuitry 210 includes a separate processor, specially-configured field programmable gate array (FPGA), or a specially-programmed application specific integrated circuit (ASIC).

In some embodiments, the apparatus 200 includes hypothesis acceptance circuitry 212. The hypothesis acceptance circuitry 212 includes hardware, software, firmware, and/or a combination thereof, that supports determining if a recognition hypothesis should be accepted or rejected based at least in part on adjusted confidence score(s) associated with the one or more words in the recognition hypothesis. For example, in some embodiments, the hypothesis acceptance circuitry 212 includes hardware, software, firmware, and/or a combination thereof that adjusts the initial confidence score associated with a hypothesized word based at least in part on a confidence score adjustment value associated with the word. In some embodiments, the hypothesis acceptance circuitry 212 includes hardware, software, firmware, and/or a combination thereof, that compares the adjusted confidence score associated with each word in a recognition hypothesis to a rejection threshold to determine whether to accept the recognition hypothesis. In some embodiments, the hypothesis acceptance circuitry 212 includes a separate processor, specially configured field programmable gate array (FPGA), or a specially programmed application specific integrated circuit (ASIC).

In some embodiments, the apparatus 200 includes hypothesis matching circuitry 214. The hypothesis matching circuitry 214 includes hardware, software, firmware, and/or a combination thereof, that supports determining if a word in a recognition hypothesis matches the corresponding word in an expected response. For example, in some embodiments, the hypothesis matching circuitry 214 includes hardware, software, firmware, and/or a combination thereof, that maintains at least one data repository comprising any number of expected responses. Additionally or alternatively, in some embodiments, the hypothesis matching circuitry 214 includes hardware, software, firmware, and/or a combination thereof, that receives a recognition hypothesis, for example from hypothesis generation circuitry 210, and compares at least one word in the recognition hypothesis to the corresponding word in the expected response. Additionally or alternatively, in some embodiments, the hypothesis matching circuitry 214 includes hardware, software, firmware, and/or a combination thereof, that retrieves a recognition hypothesis from a data repository, such as a data repository maintained by the hypothesis generation circuitry 210. In some embodiments, the hypothesis matching circuitry 214 includes a separate processor, specially configured field programmable gate array (FPGA), or a specially programmed application specific integrated circuit (ASIC).

In some embodiments, the apparatus 200 includes adaptation circuitry 216. The adaptation circuitry 216 includes hardware, software, firmware, and/or a combination thereof, that supports storing, maintaining, updating, and/or the like a confidence score adjustment value(s). In some embodiments, the adaptation circuitry 216 includes hardware, software, firmware, and/or a combination thereof that generates, updates, and/or stores statistical data associated with each word in a recognition hypothesis. In some embodiments, the adaptation circuitry 216 includes hardware, software, firmware, and/or a combination thereof that updates the confidence score adjustment value associated with a word to generate an updated confidence score adjustment value for the word. For example, in some embodiments, the adaptation circuitry 216 applies the statistical data associated with a word in the recognition hypothesis to historical statistical data associated with the word to generate an updated confidence score adjustment value for the word. In some embodiments, the hypothesis matching circuitry 214 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, hypothesis generation circuitry 210, hypothesis acceptance circuitry 212, hypothesis matching circuitry 214, and/or adaptation circuitry 216 are combinable. Alternatively or additionally, in some embodiments, one or more of the sets of circuitry perform some or all of the functionality described associated with another component. For example, in some embodiments, two or more of the sets of circuitry embodied by processor 202, memory 204, input/ output circuitry 206, communications circuitry 208, hypothesis generation circuitry 210, hypothesis acceptance circuitry 212, hypothesis matching circuitry 214, and/or adaptation circuitry 216 are combined into a single module embodied in hardware, software, firmware, and/or a combination thereof. Similarly, in some embodiments, one or more of the sets of circuitry, for example hypothesis generation circuitry 210, hypothesis acceptance circuitry 212, hypothesis matching circuitry 214, and/or adaptation circuitry 216, is/are combined with the processor 202, such that the processor 202 performs one or more of the operations described above with respect to each of these sets of circuitry embodied by the hypothesis generation circuitry 210, hypothesis acceptance circuitry 212, hypothesis matching circuitry 214, and/or adaptation circuitry 216.

Example Data Environments and Architectures of the Disclosure

Having described example systems and apparatuses of the disclosure, example data architectures, data environments, and data flows will now be described. In some embodiments, the data architectures represent data object(s) maintained and processed in particular computing environments. In some embodiments, the computing environment(s) is/are maintained via hardware, software, firmware, and/or a combination thereof, that execute one or more software application(s) that manage such data. For example, in some embodiments, the apparatus 200 executes one or more software application(s) that maintain the data architecture(s) as depicted and described to, alone or in conjunction with one another, perform the functionality as depicted and described with respect to adapting speech recognition confidence scores to a user(s).

FIG. 3 illustrates a visualization of an example data environment for adapting speech recognition confidence scores to a user(s) in accordance with at least one embodiment of the present disclosure. Specifically, the data environment for adapting speech recognition confidence scores to a user(s) is performed by a speech recognition system 102. In some embodiments, the speech recognition system 102 is embodied by the apparatus 200 as depicted and described herein. In some embodiments, the speech recognition system 102 causes rendering of, or otherwise provides access to, one or more user interfaces specially configured to enable inputting of data.

As illustrated, a recognizer module 304 of the speech recognition system 102 receives an input speech 302 corresponding to one or more words uttered by a user, and processes the input speech 302 to generate a recognition hypothesis 306. In some embodiments, a recognition hypothesis includes a sequence of one or more words that is hypothesized by the speech recognition system as the word(s) uttered by a user. Additionally or alternatively, in some embodiments, a recognition hypothesis includes a confidence score for each word of the one or more words in a recognition hypothesis. As illustrated, in some embodiments, the confidence score associated with each word in the recognition hypothesis corresponds to or otherwise represents an initial confidence score for the respective word. For example, in some embodiments, the recognition hypothesis 306 comprises one or more words and an initial confidence score 328 assigned to each of the one or more words by the recognizer module 304.

In some embodiments, the recognizer module 304 generates the recognition hypothesis 306 using a recognition algorithm. The recognition algorithm, for example, may rely on one or more probabilistic models and/or other modeling techniques to generate the recognition hypothesis 306. One non-limiting example of modeling technique that may be utilized by the recognizer module 304 includes Hidden Markov Model (HMM) technique. In speech recognition, HMM models use sequences of states to describe vocabulary items, which may be words, phrases, or subword units. As used herein, the term "word" is used to denote a vocabulary item, and thus may mean a word, a segment or part of a word, or a compound word, such as "next slot" or "say again." Therefore, the term "word" is not limited to just a single word. Each state in an HMM may represent one or more acoustic events and serve to assign a probability to each observed feature vector. Accordingly, a path through the HMM states may produce a probabilistic indication of a series of acoustic feature vectors. The model is searched such that different, competing hypotheses (or paths) are scored (e.g., acoustic matching or acoustic searching). A state S can be reached at a time T via a number of different paths. For each path reaching a particular state at a particular time, a path probability is calculated. Using the Viterbi algorithm, each path through the HMM can be assigned a probability. In particular, the best path can be assigned a probability. Furthermore, each word in the best path can be assigned a probability. Each of these probabilities can be used as a confidence score or combined with other measurements, estimates or numbers to derive a confidence score. The path with the highest confidence score, the best hypothesis, can then be further analyzed. It should be understood that other speech recognition models are also contemplated within the scope of the present invention; for example, template matching dynamic time warping (DTW) and neural networks are two such exemplary, alternative modeling techniques.

As illustrated, the input speech 302 is received from a client system 104. The input speech 302 may be captured by the client system 104 in a variety of ways. For example, a microphone or other electro-acoustical device senses speech from a user and transmit the input speech to the recognizer module 304.

In some embodiments, the recognizer module 304 includes one or more components, for example, signal processor, feature generator, decoder, and/or the like that are leveraged by the recognizer module 304 to process the input speech, and generate a recognition hypothesis 306. In some embodiments, the signal processor includes analog-to-digital converter(s), filter(s), equalization circuitry, and/or other components that convert the received input speech 302 into a digitized stream of data that can be separated into separate units for analysis such as, for example, frames. In such some embodiment, the signal processor is configured to divide the digital stream of data that is created into a sequence of frames, each of which is then processed by a feature generator to generate features of the frames. The generated features, for example, may comprise acoustic features of the frames. In such some embodiments, the features are represented in the form of a vector, matrix, or otherwise organized set of numbers. The feature generator may utilize one or more of a variety of techniques to represent speech. As one example, the feature generator may utilize a Linear Predictive Coding (LPC) coefficients to represent speech. As another example, the feature generator may utilize mel frequency cepstral coefficients to represent speech. In such some embodiments, the decoder is configured to generate the recognition hypothesis 306 based at least in part on the features and using a recognition algorithm.

In some embodiments, for each word in the recognition hypothesis 306, the initial confidence score 328 associated with the respective word is adjusted based at least in part on a confidence score adjustment value 308 associated with the respective word. For example, as illustrated, in some embodiments a confidence score adjustment module 309 of the speech recognition system 102 is configured to retrieve the confidence score adjustment value 308 associated with each word in the recognition hypothesis 306, for example, from a confidence score adjustment library 310. In some embodiments, the confidence score adjustment module 309 is configured to calculate the confidence score adjustment value 308 in real-time, for example, on-demand. In such some embodiments, the confidence score adjustment module 309 may be configured to retrieve statistical data associated with a word from a statistics data repository 330 to calculate the confidence score adjustment value 308. In some embodiments, the recognition system 102 includes an update module 340 configured to update statistical data associated with a word, for example, in response to determining that the recognition hypothesis 306 matches the expected response 314. For example, the update module 340 may be configured to generate updated statistical data 332 and store the updated statistical data 332 in the statistics data repository 330 in response to determining that the recognition hypothesis 306 matches the expected response 314. In such some embodiments, the speech recognition system 102 may or may not include a confidence score adjustment library 310. In some embodiments, the update module 340 may be configured to generate updated confidence score adjustment value 322 and store the updated confidence score adjustment value 322 in the confidence score adjustment library 310 in embodiments that include a confidence score adjustment library 310. In some embodiments, the confidence score adjustment library 310 may comprise a data repository.

In some embodiments, for each word in the recognition hypothesis 306, the confidence score adjustment value 308 is applied to the initial confidence score for the respective word to generate an adjusted confidence score 312. In some embodiments, the adjusted confidence score 312 for each word is compared to a rejection threshold 317 to determine whether to accept or reject the word. As illustrated, in some embodiments, the speech recognition system 102 leverages an acceptance algorithm 316 to determine whether to accept or reject a particular word in the recognition hypothesis 306 based at least in part on a comparison of the particular word to the rejection threshold 317. In some embodiments, if the adjusted confidence score 312 for each word satisfies the rejection threshold 317, the recognition hypothesis 306 is accepted as recognized speech. In some embodiments, if the adjusted confidence score 312 for at least one word fails to satisfy the rejection threshold 317, the recognition hypothesis 306 is rejected.

As described herein, some embodiments of the present disclosure leverage expected responses to adapt speech recognition confidence scores to a user(s), which in turn improves the accuracy of the speech recognition system. To provide context, in some examples, the most likely speech input to be received is known beforehand or can be determined and is provided as an expected response. For example, when picking a part from a bin, or placing an item in a warehouse location, there can be a check-digit that verifies the location of the user, or the operation being performed by the user. During the operation, the user may be prompted to go to a location and speak the check-digit (or check-phrase) displayed at and associated with the location. The speech recognition system attempts to recognize the user's spoken response and compare it with this check-digit or check-phrase to confirm that the user is at the correct location before prompting the user to perform an operation, such as picking a case of product. As used herein, "check-digit" refers to the sequence of one or more words that are associated with a location, bin or slot for the purpose of verifying a user's location. A "check-digit" may, for example, be a three-digit number, or non-digit words, or a combination of these. In addition to this exemplary environment, there may be other scenarios in which a particular response or series of responses is expected from the user.

In some embodiments, the expected response is retrieved from a data repository. For example, the speech recognition system 102 may be associated with a data repository that stores expected responses. Alternatively, the expected response might be dynamically determined prior to the comparison.

In some embodiments, the speech recognition system 102 compares the recognition hypothesis 306 for the input speech 302 to an expected response 314 to determine a match. In some embodiments comparing the recognition hypothesis 306 to an expected response includes comparing each word in the recognition hypothesis to a corresponding word in the expected response, for example, based at least in part on the location of the respective word in the sequence of one or more words of the recognition hypothesis. As illustrated, in some embodiments, the speech recognition system 102 leverages a matching algorithm 318 to determine if a word in a recognition hypothesis 306 matches the corresponding word in the expected response 314 and/or to determine if the recognition hypothesis 306 matches the expected response 314.

In some embodiments, the matching algorithm 318 is configured to compare words (e.g., word tokens) to determine a match. In some embodiments, the matching algorithm 318 may comprise any conventional algorithm that is configured to compare a first set of sequence of words to a second set of sequence of words to determine a match with respect to each pair of words compared and/or to determine a match with respect to the pair of sequence of one or more words. In one example embodiment, the matching algorithm 318 is configured to compare the word(s) in a first set of sequence of words (e.g., recognition hypothesis) to the word(s) in a second set of sequence of words (e.g., expected response) based on the location of the word(s) in the corresponding set of sequence of words. For example, in some embodiments, the first word in a first set of sequence of words is compared to the first word in the second set of sequence of words, the second word in the first set of sequence of words is compared to the second word in the second set of sequence of words, the third word in the first set of sequence of words is compared to the third word in the second set of sequence of words. In some embodiments, the matching algorithm 318 is configured to generate an output that indicates whether a particular word in the first set of sequence of words matches the corresponding word in the second set of sequence of words. Additionally or alternatively, in some embodiments, the matching algorithm 318 is configured to generate an output that indicates whether the first set of sequence of words matches the second set of sequence of words based on the comparison of each corresponding word pair(s). In some embodiments, comparing the recognition hypothesis 306 to an expected response 314 using the matching algorithm 318 comprises generating a matching score for each pair of words compared, and determining if the matching score satisfies a threshold. Additionally or alternatively, in some embodiments, comparing the recognition hypothesis 306 to an expect response using the matching algorithm 318 comprises generating a matching score for the pair of recognition hypothesis 306 and expected response 314, and determining if the matching score satisfies a threshold. In some embodiments, a recognition hypothesis 306 may be determined to match the expected response if the matching score satisfies the threshold.

As described herein, in some embodiments, the speech recognition system 102 is configured to adapt speech recognition confidence score(s) to a user using an expected response and based at least in part on updating the confidence score adjustment value associated with a word. For example, in some embodiments, if a word in the recognition hypothesis 306 is determined to match the corresponding word in the expected response 314, the speech recognition system 102 generates updated confidence score adjustment value 322 for the word, where the updated confidence score adjustment value 322 may be configured to be applied to a subsequent recognition hypothesis that includes another instance of the same word. In some embodiments, the speech recognition system 102 generates updated confidence score adjustment value 322 for a word based at least in part on statistical data associated with the word. Examples of statistical data include a sum measure, a count measure, sum of squares measure, average measure, and/or the like. In some embodiments, the statistical data associated with a particular word comprises one or more of a sum measure, count measure, or sum of squares measure. It would be appreciated that in some embodiments, statistical data associated with a given word may include other statistical measures. In some embodiments, the speech recognition system 102 updates the statistical data associated with a word in the recognition hypothesis in response to determining that the recognition hypothesis and the expected response match exactly (e.g., each word in the recognition hypothesis matches each corresponding word in the expected response, and/or other criteria). For example, in some embodiments, the speech recognition system 102 updates the statistical data associated with each word in the recognition hypothesis in response to determining that the recognition hypothesis and the expected response match exactly. The updated statistical data may be used to calculate the updated confidence score adjustment value 322.

In some embodiments, the statistical data for a particular word is determined based at least in part on a set of initial confidence scores associated with the word in the recognition hypothesis 306 and/or a set of initial confidence scores associated with the word in historical recognition hypotheses, for example, at least one historical recognition hypotheses. For example, in some embodiments, to update the statistical data for a particular word, the speech recognition system 102 may apply the initial confidence score associated with the word to historical statistical data for the word to generate updated statistical data. The speech recognition system 102 may generate updated confidence score adjustment value 322 based at least in part on the updated statistical data, where the updated confidence score adjustment value 322 is configured to be applied to a subsequent recognition hypothesis that includes another instance of the same word. In some embodiments, the speech recognition system 102 leverages one or more models to generate the updated statistical data and/or updated confidence score adjustment value.

In some embodiments, the updated confidence score adjustment value 322 is generated based at least in part on one or more conditions. For example, the one or more models are trained, configured, and/or the like to generate updated confidence score adjustment values that satisfy one or more conditions. The one or more conditions may be configured to reduce the risk of false rejections, false acceptance, occurrences of out of vocabulary insertion errors, and/or other factors that impact the accuracy of a speech recognition system. One example of such conditions represents that the average adjusted confidence score associated with a word is at a predefined value above the rejection threshold. In this regard, the one or more models may be trained, configured and/or the like to generate an updated confidence score adjustment value for a given word such that the average adjusted confidence scores for the word based on the initial confidence score and historical confidence scores associated with the word satisfy the rejection threshold by a predefined value. Another example of such conditions represents that the average adjusted confidence score associated with a word is N standard deviations above the rejection threshold, where N may be configurable and may be any number (e.g., 1, 2, 2.5, 3, and/or the like). In this regard, the one or more models may be trained, configured, and/or the like to generate an updated confidence score adjustment value for a given word, such that the average adjusted confidence scores for the word based on the initial confidence score and historical confidence scores associated with the word is N standard deviations above the rejection threshold.

In some embodiments, the confidence score adjustment library 310 is updated to include the updated confidence score adjustment value 322 for each word. Alternatively or additionally, in some embodiments, the statistical data associated with a word may be stored in a statistics data repository 330. In such some embodiments, the speech recognition system 102 may or may not include a confidence score adjustment library 310. For example, the confidence score adjustment values may be determined (e.g., calculated) in real-time (e.g. on-demand), for example, based on the statistical data associated with the word which may be retrieved from the statistics data repository 330.

Example Processes of the Disclosure

Having described example systems and apparatuses, and data visualizations, in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depict a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 4 illustrates a flow chart depicting example operations of an example process for adjusting confidence score(s) in accordance with at least one embodiment of the present disclosure. Specifically, FIG. 4 depicts an example process 400. In some embodiments, the process 400 is embodied by computer program code stored on a non-transitory computer-readable storage medium of a computer program product configured for execution to perform the process as depicted and described. Alternatively or additionally, in some embodiments, the process 400 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one external data repository, client system, and/or the like, to perform one or more of the operation(s) as depicted and described. For purposes of simplifying the description, the process 400 is described as performed by and from the perspective of the apparatus 200.

Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements the process 400 may perform functions at substantially the same time or in a specific sequence.

According to some examples, the method includes receiving, at a speech recognition system, an input speech at block 402. In some embodiments, the apparatus 200 embodying the speech recognition system receives the input speech from a client system in response to an utterance by a user. For example, the input speech may be received through a microphone associated with the client system.

According to some examples, the method includes generating a recognition hypothesis at block 404. In some embodiments, the apparatus 200 generates the recognition hypothesis for the received input speech based on the received input speech and using a recognition algorithm. In some embodiments, for example, the apparatus 200, using the recognition algorithm, process one or more features extracted from the input speech to generate the recognition hypothesis. In some embodiments, the apparatus 200 is configured to generate the features for the input speech, where the features may be represented as vectors (e.g., feature vectors). In some embodiments, the features comprise acoustic features for the input speech. In some embodiments, the apparatus 200 is configured to digitize the received input speech and separate the input speech into the features.

In some embodiments, the recognition hypothesis comprises a sequence of one or more words and an associated initial confidence score for each of the one or more words. For example in some embodiments, the recognition hypothesis comprises at least one pairing comprising a word and an initial confidence score associated with the word.

According to some examples, the method includes determining for a word in a pairing (e.g., comprising the respective word and corresponding initial confidence score), the confidence score adjustment value for the word at block 406. For example, the apparatus 200 may determine for the word in each pairing, the confidence score adjustment value for the word. In some embodiments, the apparatus 200 determines the confidence score adjustment value for a word by retrieving the confidence score adjustment value from a confidence score adjustment data library. The confidence score adjustment data library, for example, may be configured to store confidence score adjustment values for each word of a plurality of words. In some embodiments, the apparatus 200 determines the confidence score adjustment value for a word by retrieving statistical data associated with the word from a statistics data repository (e.g., data store), and calculating the confidence score adjustment value for the word based at least in part on the retrieved statistical data. The statistics data repository, for example, may be configured to store statistical data for each word of a plurality of words.

According to some examples, the method includes generating an adjusted confidence score for a word in a pairing at block 408. For example, the apparatus 200 may generate an adjusted confidence score for the word in each pairing. For example, in some embodiments, the apparatus 200 generates adjusted confidence for a word based at least in part on the confidence score adjustment value for the word. In some embodiments, the apparatus 200 generates the adjusted confidence score for a word by applying the confidence score adjustment value associated with the word to an initial confidence score for the word. In some embodiments applying the confidence score adjustment value associated with a word to an initial confidence score for the word includes increasing the initial confidence score, for example, adding the confidence score adjustment value associated with the word to an initial confidence score. Additionally or alternatively, in some embodiments applying the confidence score adjustment value associated with a word to an initial confidence score for the word includes decreasing the initial confidence score.

According to some examples, the method includes determining if the adjusted confidence score for a word satisfies a rejection threshold at block 410. For example, the apparatus 200 may determine if the adjusted confidence score for each word satisfies a rejection threshold for the word. In some embodiments, the rejection threshold may be different for different words. In some embodiments, the apparatus 200 determines if the adjusted confidence score for a word satisfies (e.g., exceeds, is below, is equal to, and/or the like) a rejection threshold by comparing the adjusted confidence score for the word to the rejection threshold. In some embodiments, the recognition hypothesis is rejected in response to determining that at least one word in the recognition hypothesis is associated with an adjusted confidence score that fails to satisfy the corresponding rejection threshold. Additionally or alternatively, in some embodiments, the recognition hypothesis is accepted in response to determining that each word in the recognition hypothesis is associated with an adjusted confidence score that satisfies the corresponding rejection threshold(s). In some embodiments, a word is rejected in response to determining that the word is associated with an adjusted confidence score that fails to satisfy the rejection threshold for the word. Additionally or alternatively, in some embodiments, a word is accepted in response to determining that the word is associated with an adjusted confidence score that satisfies the rejection threshold for the word.

According to some examples, the method includes, in response to determining that the adjusted confidence score for each word satisfies the rejection threshold at block 412a, accepting the recognition hypothesis as recognized speech.

According to some examples, the method includes in response to determining that the adjusted confidence score for at least one word fails to satisfy the rejection threshold at block 412b, rejecting the recognition hypothesis as recognized speech.

FIG. 5 illustrates a flow chart depicting example operations of an example process for adapting speech recognition confidence scores to a user(s) in accordance with at least one embodiment of the present disclosure. Specifically, FIG. 5 depicts an example process 500. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one external data repository, client system, and/or the like, to perform one or more of the operation(s) as depicted and described. For purposes of simplifying the description, the process 500 is described as performed by and from the perspective of the apparatus 200.

Although the example process 500 depicts a particular sequence of operations, the sequence may be altered without departing from the scope of the present disclosure. For example, some of the operations depicted may be performed in parallel or in a different sequence that does not materially affect the function of the process 500. For example, in some embodiments, the process 500 may continue from block 404 and/or may be performed in parallel with blocks 406 to 408 described above in connection with FIG. 4. In other examples, different components of an example device or system that implements the process 500 may perform functions at substantially the same time or in a specific sequence. For purposes of simplifying the description, the process 500 is described as continuing from block 408.

According to some examples, the method includes identifying the expected response corresponding to the input speech at block 502. In some embodiments, the apparatus 200 identifies the expected response based at least in part on retrieving the expected response from a data repository. In some embodiments, the expected response comprises a sequence of one or more words that a user is expected to utter, for example, at a particular step in a workflow.

According to some examples, the method includes comparing the word in a pairing associated with the recognition hypothesis generated for the input speech to the corresponding word in the expected response at block 504. For example, the apparatus 200 may compare each word in a paring associated with the recognition hypothesis to the corresponding word in the expected response. In some embodiments, the apparatus 200 compares the word in a pairing to a corresponding word in the expected response using a matching algorithm, for example, such as the matching algorithm described above in connection to FIG. 3. In some embodiments, the apparatus 200, for example, using a matching algorithm determines the corresponding word in the expected response for a respective word based at least in part on the location of the respective word in the sequence of one or more words of the recognition hypothesis.

According to some examples, the method includes updating the statistical data associated with a word in the recognition hypothesis in response to determining that the recognition hypothesis matches the expected response at block 506. For example, for each word, the apparatus 200 may update the statistical data associated with the respective word in response to determining that the recognition hypothesis matches the expected response. In some embodiments, the recognition hypothesis may be determined to match the expected response if each word in the recognition hypothesis matches the corresponding word in the expected response. It should be understood, that in some embodiments, other criteria may be used to determine a match. For example, in some embodiments, the apparatus 200 may determine that the recognition hypothesis matches the expected response if a certain percentage of the words match. In some embodiments, the statistical data associated with a given word may be updated in response to the determining that the word matches the corresponding word in the expected response. In some embodiments, the updated statistical data for a word may be used to calculate updated confidence score adjustment value for the word, where the updated confidence score adjustment value may be configured to be applied to a subsequent recognition hypothesis that includes another instance of the same word. In some embodiments, the statistical data associated with a particular word comprises one or more of a sum measure, count measure, or sum of squares measure. In some embodiments, the statistical data for a particular word is determined based at least in part on each initial confidence score associated with the word in the recognition hypothesis and/or a set of initial confidence scores associated with the word in at least one historical recognition hypothesis.

In some embodiments, the confidence score adjustment value associated with a word may be updated in response to determining that the word matches the corresponding word in the expected response. For example, in some embodiments, the apparatus 200 in response to determining that a word matches the corresponding word in the expected response, updates the confidence score adjustment value associated with the word to generate an updated confidence score adjustment value for the word. In some embodiments, the confidence score adjustment value associated with a word is updated in response to determining that the recognition hypothesis matches the expected response. For example, in some embodiments, the apparatus 200 updates the confidence score adjustment value associated with a word in the recognition hypothesis in response to determining that the expected response matches the recognition hypothesis. In such some embodiments, the apparatus 200 in response to determining that the recognition hypothesis matches the expected response may update the confidence score adjustment value associated with a word to generate an updated confidence score adjustment value for the word. For example, in some embodiments, the apparatus 200 in response to determining that the recognition hypothesis matches the expected response, may update the confidence score adjustment value associated with each word to generate an updated confidence score adjustment value for each word.

In some embodiments, the apparatus 200 generates the statistical data and/or updated confidence score adjustment value for a word using one or more models. Additionally or alternatively, in some embodiments, the apparatus 200 generates the updated confidence score adjustment values based at least in part on one or more conditions. For example, in some embodiments, the one or more models are trained, configured, and/or the like to generate updated confidence score adjustment values that satisfy one or more conditions. The one or more conditions may be configured to reduce the risk of false rejections, false acceptance, occurrences of out of vocabulary insertion errors, and/or other factors that impact the accuracy of a speech recognition system. One example of such conditions represents that the average adjusted confidence score associated with a word is at a predefined value above the rejection threshold. In this regard, the one or more models may be trained configured and/or the like to generate an updated confidence score adjustment value for a given word such that the average adjusted confidence score for the word based on the initial confidence score and/or historical confidence scores associated with the word satisfies the rejection threshold by a predefined value. Another example of such conditions represents that the average adjusted confidence score associated with a word is N standard deviations above the rejection threshold, where N may be any numerical value. In this regard, the one or more models may be trained, configured and/or the like to generate an updated confidence score adjustment value for a given word, such that the average adjusted confidence score for the word based on the initial confidence score and/or historical confidence scores associated with the word is N standard deviations above the rejection threshold.

In some embodiments, updating a confidence score adjustment value for a given word includes updating the confidence score adjustment data library to include the updated confidence score adjustment values generated for the word, wherein the updated confidence score adjustment value may be applied to a subsequent recognition hypothesis that includes another instance of the same word. For example, in some embodiments, the apparatus 200 is configured to apply the updated confidence score adjustment value for a given word to a subsequent recognition hypothesis that includes the word by adjusting the initial confidence score for the word in the subsequent recognition hypothesis based at least in part on the updated confidence score adjustment value. For example, the apparatus 200 may be configured to apply the updated confidence score adjustment value to a subsequent recognition hypothesis that includes another instance of the same word and an associated initial confidence score by adjusting the initial confidence score for the word in the subsequent recognition hypothesis based at least in part on the updated confidence score adjustment value.

To provide some context, one example environment in which an example embodiment of the present disclosure may be implemented is a voice-directed work dialog, with a central system or computer interfacing with a plurality of portable terminals carried or worn by workers, the voice interface may ask the worker to speak certain information, such as a numerical check digit. For example, in the picking application described earlier, the user may be directed to a shelf or bin and asked to pick a product and speak a two-digit numerical check digit to indicate that they are at the proper shelf or bin. The possible responses for a single numerical word spoken by the user are "zero" to "nine" and thus with a two-digit check digit, there are 100 possible combinations. The user will then speak the two-digit check digit, for example "three five" (3, 5).

The system then extracts features based on the two-digit check digit utterance by the user and generates a recognition hypothesis. The system or terminal, pursuant to an aspect of the invention, knows that the expected response from the user for the desired check digits at that shelf or bin are the words "three five." The system then compares the recognition hypothesis to the expected response (e.g., "three five") to determine if the recognition hypothesis matches the expected response. In one embodiment, only a single expected response is used. Alternatively, there may be several possible expected responses that form a subset within a larger set of possible responses. For example, a set or subset of responses might be stored in memory for use in such fashion.

In some embodiments, to improve the accuracy and efficiency of a speech recognition system, speech recognition confidence scores are adapted for a user(s) based on expected response(s) as described herein. To do this, in some embodiments, the speech recognition system updates a confidence score adjustment value applied to initial confidence scores of an hypothesized word.

Conclusion

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for adapting speech recognition to one or more users, the computer-implemented method comprising:
receiving input speech;
generating, based on the input speech and using a recognition algorithm, a recognition hypothesis wherein the recognition hypothesis comprises at least one pairing comprising a word and an initial confidence score associated with the word;
determining whether the recognition hypothesis matches an expected response based at least in part on comparing the word to a corresponding word in the expected response;
in response to determining that the recognition hypothesis matches the expected response, updating statistical data associated with the word; and
based on the updated statistical data, updating a confidence score adjustment value associated with the word according to a condition, wherein the condition represents that an average adjusted confidence score for the word based on a set of historical recognition hypothesis satisfies a rejection threshold for the word by a predefined value.

2. The computer-implemented method of claim 1, wherein the statistical data associated with the word comprises one or more of a sum measure, count measure, or sum of squares measure.

3. The computer-implemented method of claim 1, wherein the statistical data for the word is determined based at least in part on each confidence score associated with the word in the recognition hypothesis and/or each initial confidence score associated with the word in at least one historical recognition hypothesis.

4. The computer-implemented method of claim 1, further comprising:
storing the updated statistical data in data repository.

5. The computer-implemented method of claim 1 further comprising:
generating an adjusted confidence score for the word by applying the confidence score adjustment value for the word to the initial confidence score associated with the word; and
determining if the adjusted confidence score satisfies the rejection threshold for the word.

6. The computer-implemented method of claim 5, wherein the recognition hypothesis is rejected in response to determining that at least one word in the recognition hypothesis is associated with the adjusted confidence score that fails to satisfy the rejection threshold for the at least one word.

7. The computer-implemented method of claim 5, wherein the recognition hypothesis is accepted in response to determining that each word in the recognition hypothesis is associated with the adjusted confidence score that satisfies each word's respective rejection threshold.

8. The computer-implemented method of claim 5 further comprising:
generating the updated confidence score adjustment value for the word based at least in part on the updated statistical data; and
applying the updated confidence score adjustment value to a subsequent recognition hypothesis that includes another instance of the same word and an associated initial confidence score by adjusting the initial confidence score for the word in the subsequent recognition hypothesis based at least in part on the updated confidence score adjustment value.

9. The computer-implemented method of claim 5, wherein the updated confidence score adjustment value for the word is generated based at least in part on a condition, wherein the condition represents that average adjusted confidence score for the word based on the recognition hypothesis and historical recognition hypotheses correspond to N standard deviations above the rejection threshold.

10. The computer-implemented method of claim 5, wherein the word is accepted in response to determining that the word is associated with an adjusted confidence score that satisfies the rejection threshold for the word.

11. An apparatus for adapting speech recognition to one or more users, the apparatus comprising at least one processor and at least one non-transitory memory comprising program code stored thereon, wherein the at least one non-transitory memory and the program code are configured to:

receive input speech;

generate, based on the input speech and using a recognition algorithm, a recognition hypothesis wherein the recognition hypothesis comprises at least one pairing comprising a word and an initial confidence score associated with the word;

determine whether the recognition hypothesis matches an expected response based at least in part on comparing the word to a corresponding word in the expected response;

in response to determining that the recognition hypothesis matches the expected response, update statistical data associated with the word; and based on the updated statistical data, update a confidence score adjustment value associated with the word according to a condition, wherein the condition represents that an average adjusted confidence score for the word based on a set of historical recognition hypothesis satisfies a rejection threshold for the word by a predefined value.

12. The apparatus of claim 11, wherein the statistical data associated with a particular word comprises one or more of a sum measure, count measure, or sum of squares measure.

13. The apparatus of claim 11, wherein the statistical data for a particular word is determined based at least in part on each confidence score associated with the word in the recognition hypothesis and/or each initial confidence score associated with the word in at least one historical recognition hypothesis.

14. The apparatus of claim 11, wherein the at least one non-transitory memory and the program code are configured to:

store the updated statistical data in a data repository.

15. The apparatus of claim 11 wherein the at least one non-transitory memory and the program code are configured to:

generate an adjusted confidence score for the word by applying the confidence score adjustment value for the word to an initial confidence score associated with the word; and determine if the adjusted confidence score satisfies a rejection threshold.

16. The apparatus of claim 15 wherein the at least one non-transitory memory and the program code are configured to:

generate the updated confidence score adjustment value for the word based at least in part on the updated statistical data; and apply the updated confidence score adjustment value to a subsequent recognition hypothesis that includes another instance of the same word and an associated initial confidence score by adjusting the initial confidence score for the word in the subsequent recognition hypothesis based at least in part on the updated confidence score adjustment value.

17. The apparatus of claim 11, wherein the updated confidence score adjustment value for the word in each pairing is generated based at least in part on a condition, wherein the condition represents that the average adjusted confidence score for the word based on the recognition hypothesis and historical recognition hypotheses correspond to N standard deviations above the rejection threshold.

18. A computer program product for adapting speech recognition to one or more users, the computer program product comprising at least one non-transitory computer-readable storage medium having computer-readable program code portions stored therein, the computer-readable program code portions comprising an executable portion configured to:

receive input speech;

generate, based on the input speech and using a recognition algorithm, a recognition hypothesis wherein the recognition hypothesis comprises at least one pairing comprising a word and an initial confidence score associated with the word;

determine whether the recognition hypothesis matches an expected response based at least in part on comparing the word to a corresponding word in the expected response;

in response to determining that the recognition hypothesis matches the expected response, update statistical data associated with the word; and based on the updated statistical data update a confidence score adjustment value associated with the word according to a condition, wherein the condition represents that an average adjusted confidence score for the word based on a set of historical recognition hypothesis satisfies a rejection threshold for the word by a predefined value.

\*    \*    \*    \*    \*